(12) United States Patent
Lin et al.

(10) Patent No.: US 7,203,256 B2
(45) Date of Patent: Apr. 10, 2007

(54) ETHERNET CHANNEL ESTIMATION DEVICE AND METHOD

(75) Inventors: Hou-Wei Lin, Taipei (TW); Kuang-Yu Yen, Taichung (TW); Shieh-Hsing Kuo, Taipei (TW); Meng-Han Hsieh, Changhua County (TW)

(73) Assignee: Realtek Semiconductor Corp., Hsinchu (TW)

( * ) Notice: Subject to any disclaimer, the term of this patent is extended or adjusted under 35 U.S.C. 154(b) by 735 days.

(21) Appl. No.: 10/674,352

(22) Filed: Oct. 1, 2003

(65) Prior Publication Data
US 2004/0066755 A1 Apr. 8, 2004

(30) Foreign Application Priority Data
Oct. 4, 2002 (TW) .................. 91123038 A (51) Int. Cl.
*H04L 27/06* (2006.01)
*H04B 1/10* (2006.01)

(52) U.S. Cl. ....................... 375/340; 375/350
(58) Field of Classification Search ............... 375/233, 375/340, 345, 350
See application file for complete search history.

(56) References Cited

U.S. PATENT DOCUMENTS

| | | | | |
|---|---|---|---|---|
| 5,251,237 A | * | 10/1993 | Baier | .......................... 375/346 |
| 5,909,426 A | * | 6/1999 | Liau et al. | .................. 370/203 |
| 7,136,111 B2 | * | 11/2006 | Kim | ........................... 348/614 |
| 2003/0112860 A1 | * | 6/2003 | Erdogan | ..................... 375/229 |
| 2005/0084044 A1 | * | 4/2005 | Kokkonen | .................. 375/347 |

* cited by examiner

*Primary Examiner*—Don N. Vo
(74) *Attorney, Agent, or Firm*—Bacon & Thomas, PLLC (57) ABSTRACT

The apparatus for communication channel estimation device of the present invention includes: a frequency response square computing circuit, to generate a first frequency response corresponding to a first frequency and a second frequency response corresponding to a second frequency according to a input signal, and to square the first and the second frequency response; and an estimating circuit, to estimate a channel length according to the squares of the first frequency and the second frequency response. Wherein the input signal is transmitted in a symbol rate and the first frequency and the second frequency are 1/M and 1/N times of the symbol rate respectively, wherein M and N are in the order of 2.

18 Claims, 9 Drawing Sheets

ETHERNET CHANNEL ESTIMATION DEVICE AND METHOD

BACKGROUND OF THE INVENTION

1. Field of the Invention

The present invention relates to the technical field of channel estimation and, more particularly, to a Gigabit Ethernet channel estimation device and its estimation method.

2. Description of Related Art

Figure 1:
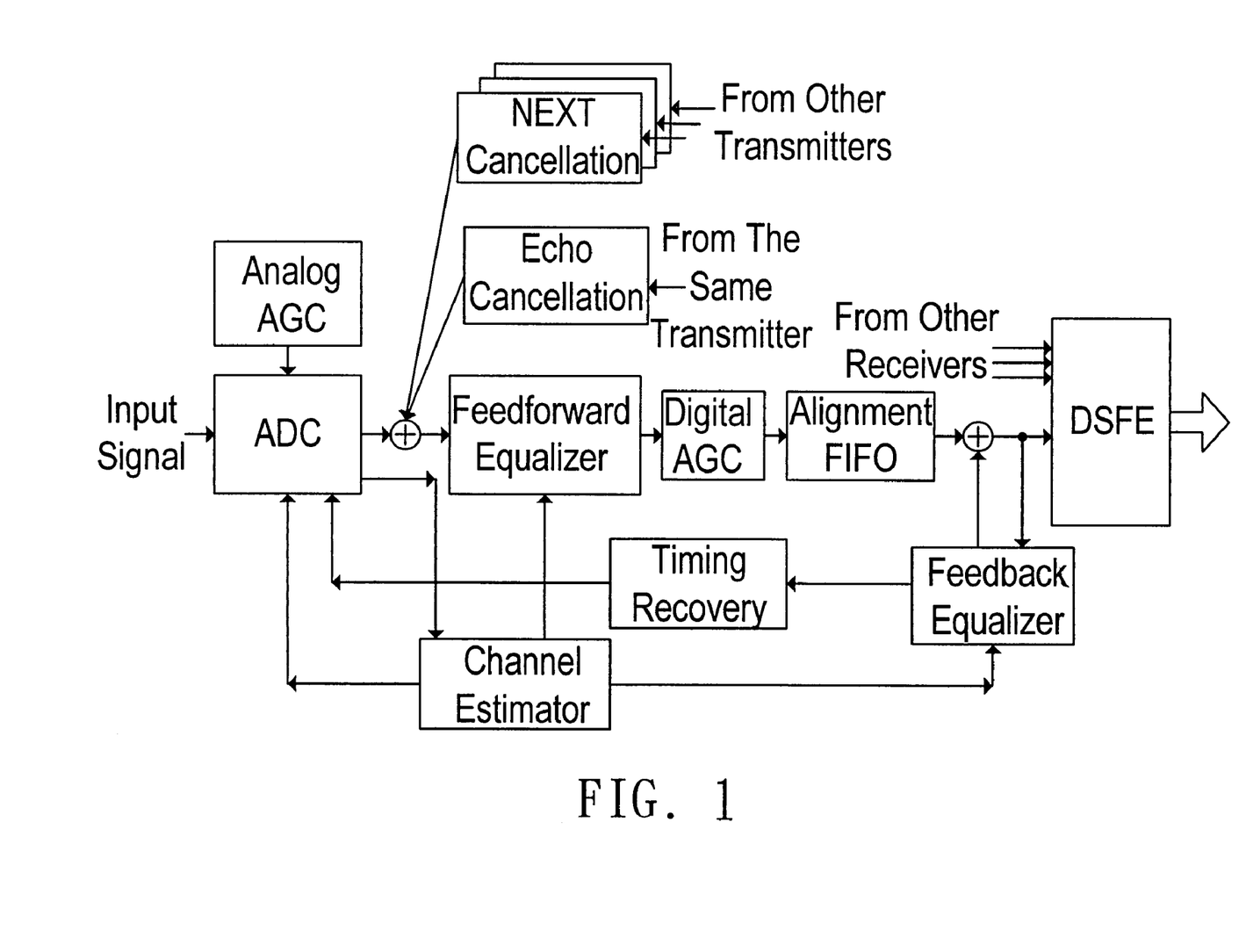
FIG. 1 shows a conventional system architecture of a Gigabit Ethernet receiver.

For conventional communication system, Inter-symbol-interference (ISI) occurs if received signals on a receiving end are commonly affected due to the limited bandwidth of transmission channels. Accordingly, a Decision Feedback Equalizer (DFE) is used to eliminate ISI. The DFE includes a feedforward equalizer (FFE) and a feedback equalizer (FBE). However, for a receiver system of a Gigabit Ethernet as shown in FIG. 1, in addition to the channel impairment, the convergence of DFE, timing recovery, echo cancellation, and NEXT (Near End Cross Talk) loop cancellation are also required to be accomplished when receiving the signals. Thus, circuitry for DFE convergence, timing recovery, echo cancellation, and NEXT loop cancellation are set in the receiver system. In order to avoid system divergence caused by interaction of those circuitry, the conventional approach is to directly set the optimized coefficients for those circuitry in initialization for convergence. The optimized coefficients are determined through channel estimation.

CAT-5 cable is defined as a transmission medium in IEEE 802.3u and 802.3ab standards. The CAT-5 cable is a time-invariant channel, which can be tested for obtaining the coefficients based on different transmission line-length in advance. For an MLT-3 transmission format applied to IEEE 802.3u (Fast Ethernet), the transmission line-length can be determined according to a received signal on a receiving end and accordingly applied to a mapping or conversion table to determine the coefficients. However, for a PAM-5 signal format used in a Gigabit Ethernet network, the transmission line-length cannot be estimated using the aforementioned methods. Additionally, the aforementioned methods have poor estimation accuracy in some circumstances (such as when the power of the transmitter is too high or too low). Another method of line-length estimation is to measure received signal energy. However, this method has the same disadvantages as compared with the others.

Since the CAT-5 channel is a kind of time-invariant environment, coefficients of a corresponding DFE or A/D auto-gain controller (AGC) can be determined if line-length can be accurately estimated.

The conventional method to estimate transmission line-length is through determining the relationship between the frequency spectrum of received signal and the transmission line-length. However, the low frequency response of received signal is greatly affected by transformer. Thus the variance of low frequency response of received signal is large with respect to different transformers manufactured by different manufacturers. Further, since most noise is present in the high frequency part, the variance of high frequency spectrum response of received signal is also large. Therefore, both the low and high frequency parts of received signal are not suitable for line-length estimation. According to simulation, a ratio of frequency response of 6 and 43 MHz can be used for transmission line-length estimation. However, in practice, the cost for hardware implementation is very high due to a lot of multiplication and addition computations are required for executing discrete Fourier transform (DFT).

Therefore, it is desirable to provide an improved channel estimation device and method to mitigate and/or obviate the aforementioned problems.

SUMMARY OF THE INVENTION

An object of the present invention is to provide an apparatus for communication channel estimation and an estimation method to accurately estimate channel (transmission line) length, such that coefficients of the DFE, A/D, and/or auto-gain controller can be obtained to generate stable and rapid convergence.

To achieve the objects, the apparatus for communication channel estimation device of the present invention includes: a frequency response square computing circuit, to generate a first frequency response corresponding to a first frequency and a second frequency response corresponding to a second frequency according to a input signal, and to square the first and the second frequency response; and an estimating circuit, to estimate a channel length according to the squares of the first frequency and the second frequency response. Wherein the input signal is transmitted in a symbol rate and the first frequency and the second frequency are 1/M and 1/N times of the symbol rate respectively, wherein M and N are in the order of 2.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
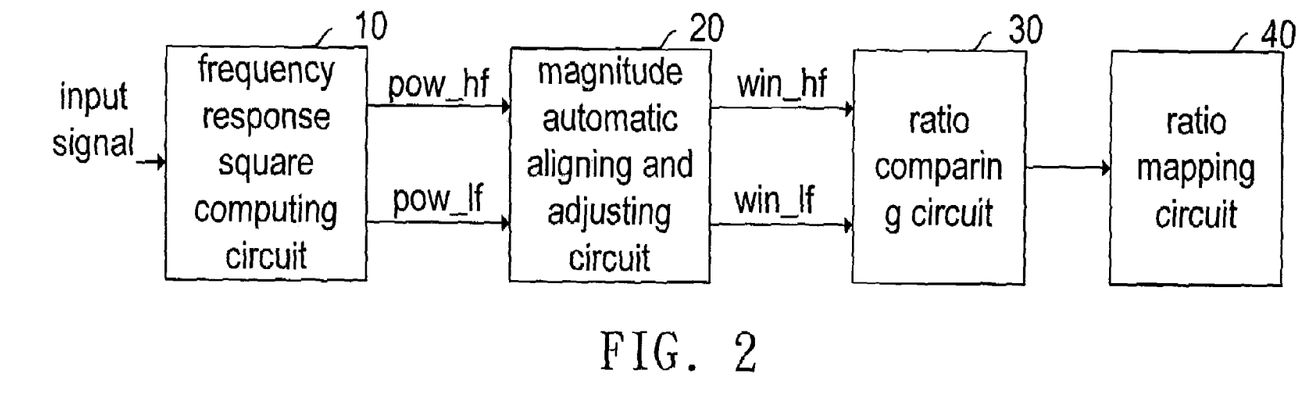
FIG. 2 shows a system architecture of an Ethernet channel estimation device according to the embodiment of the present invention.

FIG. 2 illustrates a system architecture of an Ethernet channel estimation device according to the embodiment of the present invention. As shown, the device includes a frequency response square computing circuit 10, a magnitude automatic aligning and adjusting circuit 20, a ratio comparing circuit 30 and a ratio mapping circuit 40.

For the Gigabit Ethernet, of which the symbol rate is 125 MHz, the frequency response square computing circuit 10 generates frequency responses of a first frequency at 15.625 MHz (125/8 MHz) and a second frequency at 31.25 MHz (125/4 MHz) respectively, and squares the magnitudes of frequency responses at the first frequency and the second frequency respectively. The magnitude automatic aligning and adjusting circuit 20 normalizes the square magnitudes of frequency response to generate a ratio of a first window signal to a second window signal. The ratio comparing circuit 30 multiplies the second window signal by a current ratio and compares the result with the first window signal to determine whether the current ratio is too large or too small. When the number of comparison indicating that the current ratio is too large or too small exceeds a predetermined number, a comparing result is output from the ratio comparing circuit. The ratio mapping circuit 40 adjusts coefficients of a DFE, an analog AGC or a digital AGC according to the comparing result.

Figure 3:
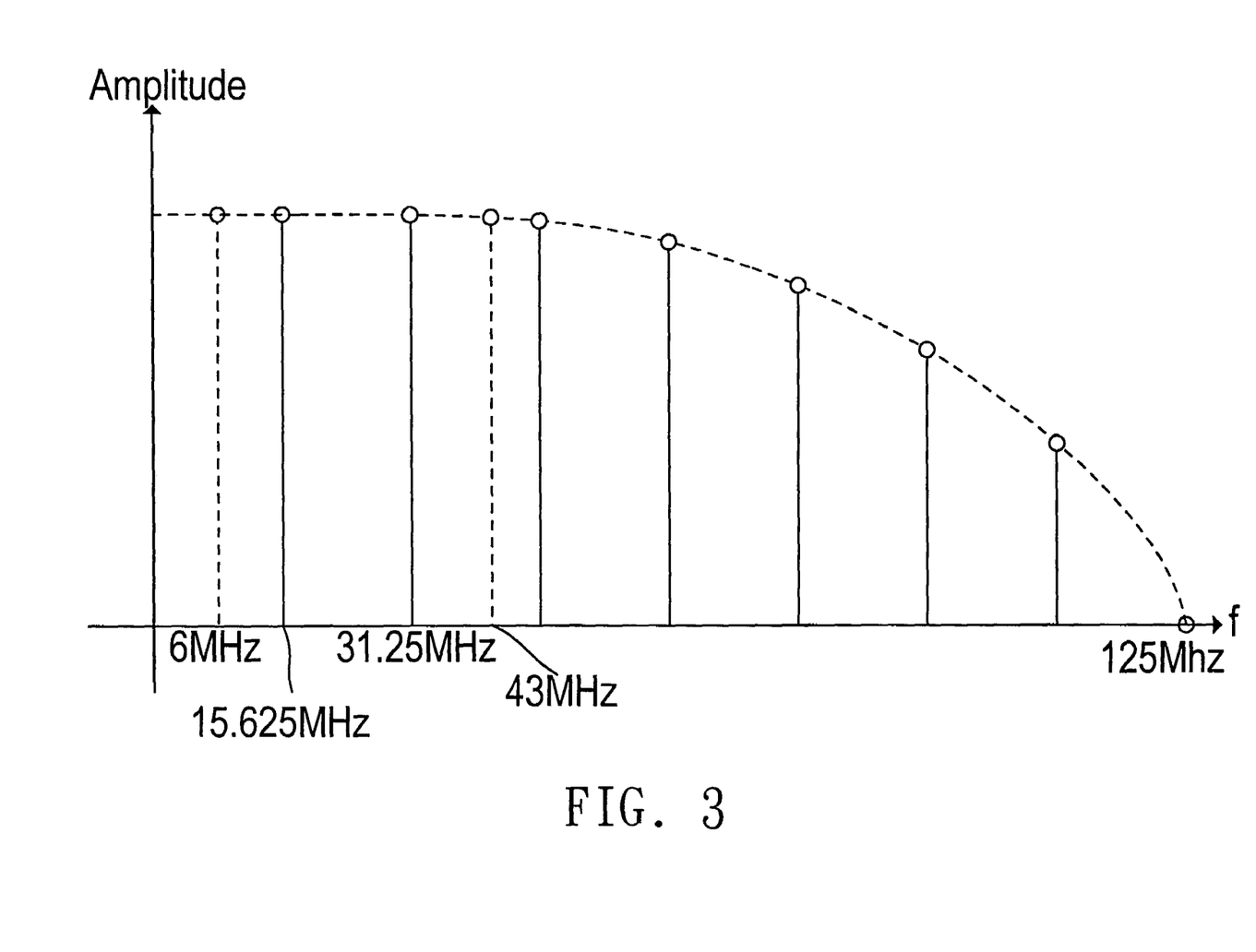
FIG. 3 shows a frequency response of an input signal.

In the conventional method, a ratio of 6 and 43 MHz frequency responses is selected to estimate line-length. As shown in FIG. 3, the frequency response square computing circuit 10 select 8 point for computing frequency response lf at the first frequency (15.625 MHz) and 4 point for computing frequency response hf at the second frequency (31.25 MHz), wherein 8-point DFT of the input signal at the first frequency and 4-point DFT of the input signal at the second frequency are represented by the following equations (1) and (2).

$$lf \mid_{15.625 \text{ MHz}} = \sum_{n=0}^{7} x(n) e^{-\frac{j2\pi n}{8}} \quad (1)$$

$$= (x(0) - x(4)) - j(x(2) - x(6)) +$$

$$\frac{1}{\sqrt{2}} x(1)(1-j)) + \frac{1}{\sqrt{2}} x(3)(-1-j) +$$

$$\frac{1}{\sqrt{2}} x(5)(-1+j) + \frac{1}{\sqrt{2}} x(7)(1+j)$$

$$hf \mid_{31.25 \text{ MHz}} = \sum_{n=0}^{3} x(n) e^{-\frac{j2\pi n}{4}} \quad (2)$$

$$= (x(0) - x(2)) - j(x(1) - x(3))$$

Because the factor of $$\frac{1}{\sqrt{2}}$$

in the equation (1) is not easy to be implemented by hardware, the factor of $$\frac{1}{\sqrt{2}}$$

is replaced with +1 and thus the equation (1) becomes:

$$lf \mid_{15.625 \text{ MHz}} = \sum_{n=0}^{7} x(n) e^{-\frac{j2\pi n}{8}} \quad (3)$$

-continued
$$\approx (x(0) + x(1) - x(3) - x(4) - x(5) + x(7)) -$$
$$j(x(1) + x(2) + x(3) - x(5) - x(6) - x(7))$$

As such, the square of first frequency response magnitude is pow_lf equal to $[x(0)-x(3)+x(1)-x(4)+x(7)-x(5)]^2+[x(1)+x(2)+x(3)-x(5)-x(6)-x(7)]^2$, and the square of second frequency response magnitude is pow_hf which is equal to $[x(0)-x(2)]^2+[x(1)-x(3)]^2$.

Figure 4:
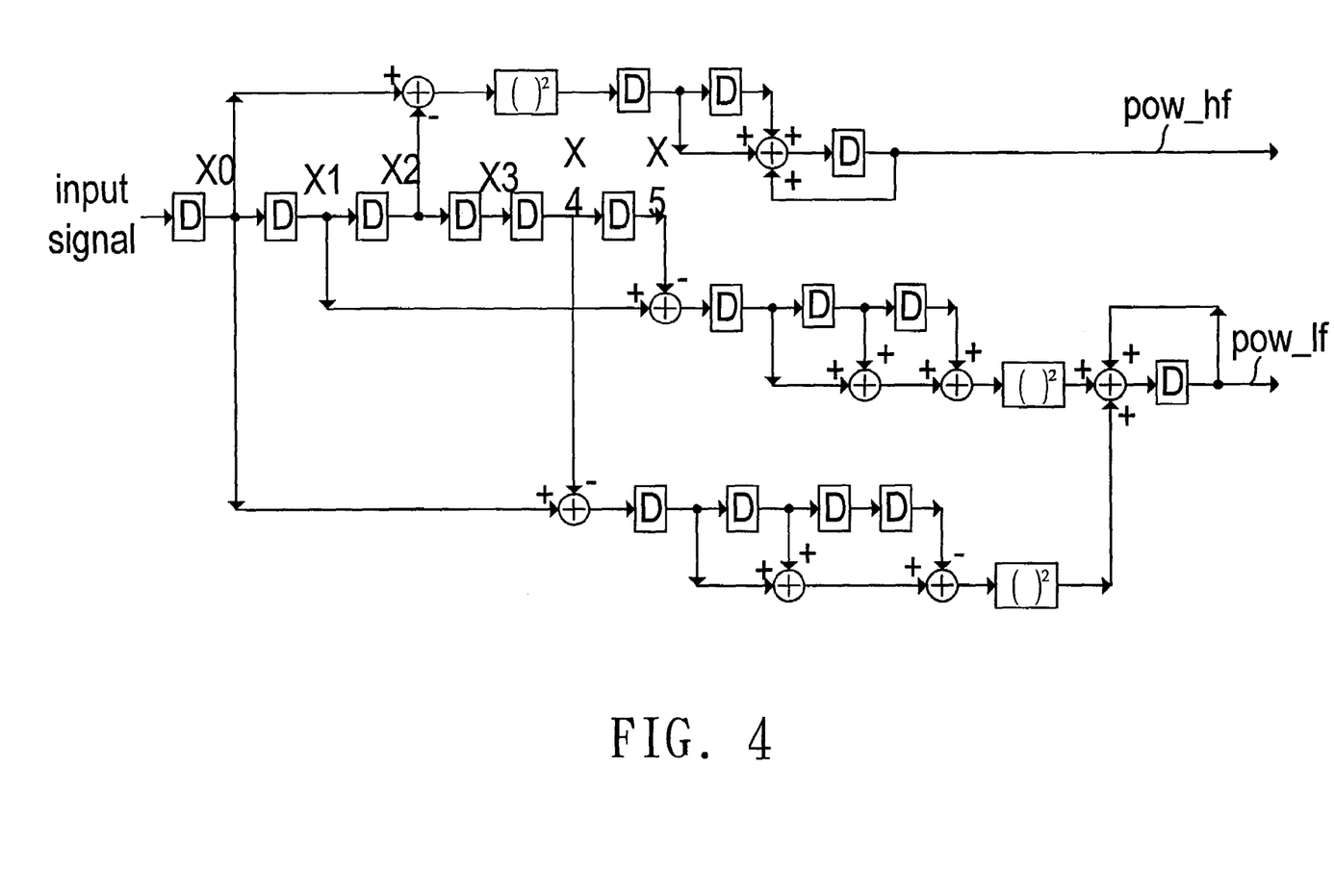
FIG. 4 is a schematic diagram of a frequency response square computing circuit according to the embodiment of the present invention.

FIG. 4 shows a diagram of the frequency response square computing circuit 10 in detail. The circuit 10 essentially computes the square of frequency response magnitude of an input signal at the first frequency and the second frequency. The circuit 10 includes a plurality of adders, a plurality of multipliers and a plurality of delay elements. When the circuit 10 receives the input signal, it generates the square of first frequency response magnitude, i.e., pow_lf=$[x(0)-x(3)+x(1)-x(4)+x(7)-x(5)]^2+[x(1)+x(2)+x(3)-x(5)-x(6)-x(7)]^2$, and the square of second frequency response magnitude, i.e., pow_hf=$[x(0)-x(2)]^2+[x(1)-x(3)]^2$.

Figure 5:
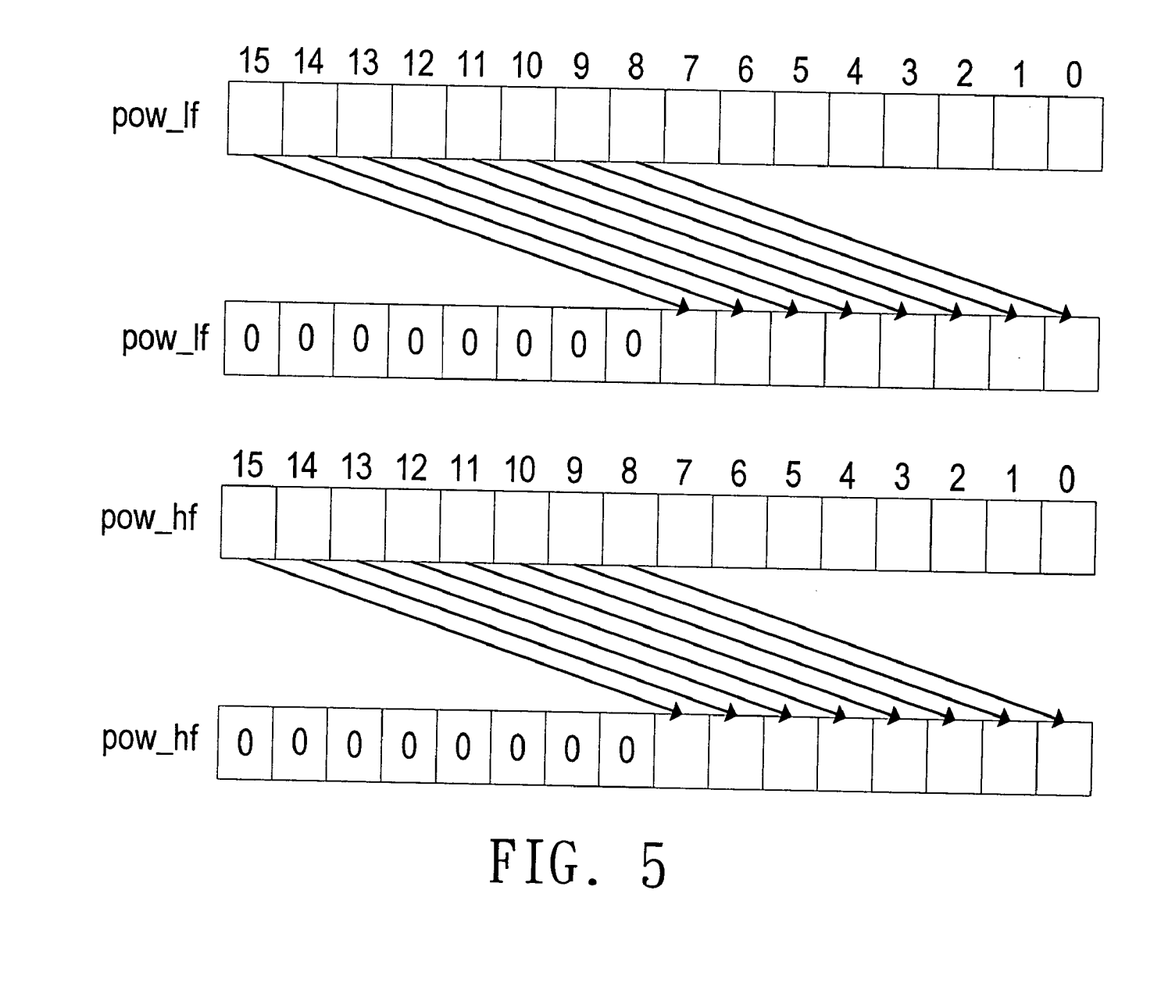
FIG. 5 is a schematic diagram of a magnitude automatic aligning and adjusting circuit according to the embodiment of the present invention.
Figure 6:
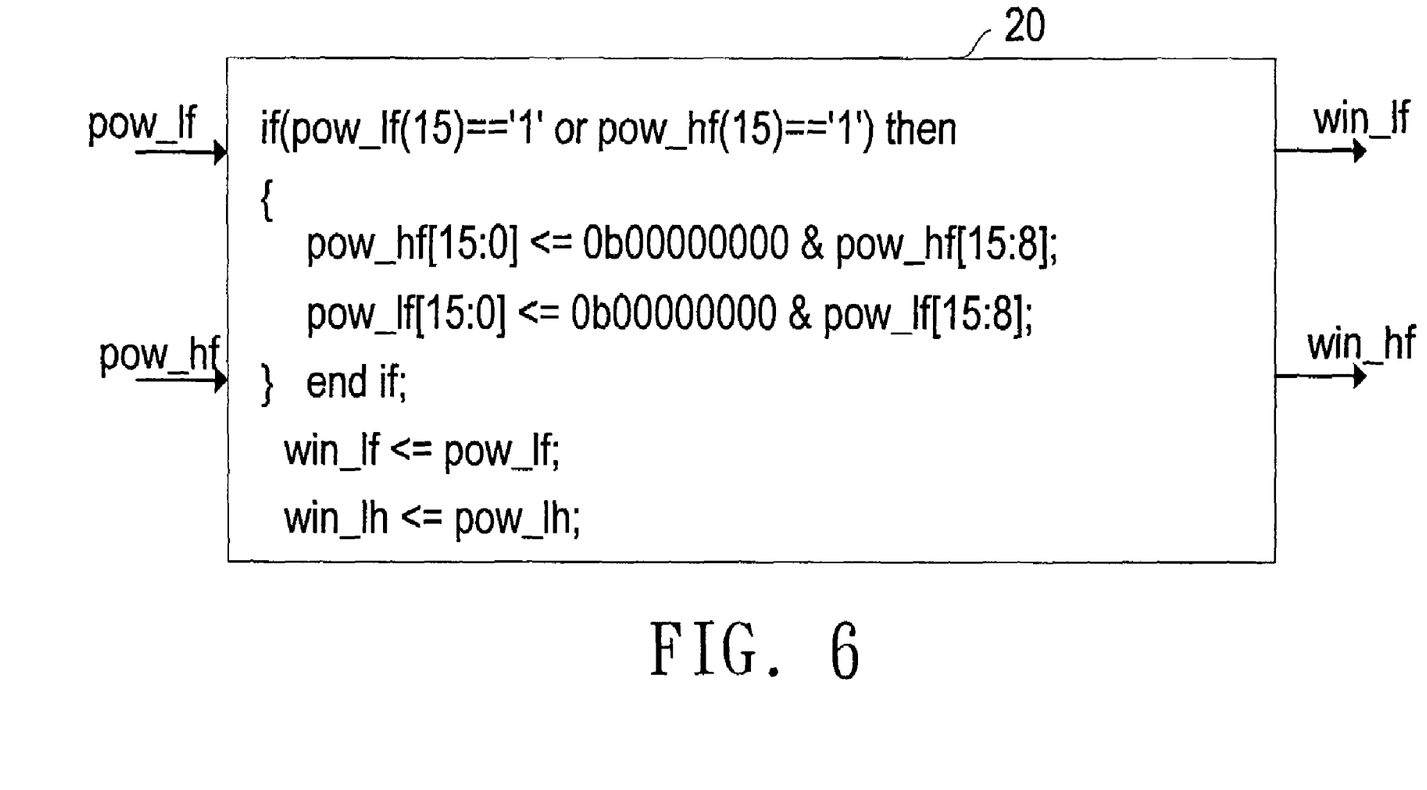
FIG. 6 is a diagram of pseudo codes of FIG. 5 according to the embodiment of the present invention.

The two signals pow_lf and pow_hf are greater than or equal to 0 and increasing. When the two signals are accumulated over allowable hardware word-length, the ratio of the two signals is in error due to overflow. To overcome this, when the circuit 20 finds that the accumulation of the two signals is over a specific value (i.e. 0X8000H), the circuit 20 keeps to generate a first window signal win_lf and a second window signal win_hf in normalization after, for example as shown in FIG. 5, the upper bits of pow_lf or pow_hf are shifted right 8 bits and then filled with 0. The circuit 20 can be implemented by pseudo codes in FIG. 6 through hardware description languages such as Verilog or VHDL.

Therefore, the ratio of line-length estimation is:

$$\text{ratio} = \frac{|lf|_{15.625 \text{ MHz}}|^2}{|hf|_{31.25 \text{ MHz}}|^2} = \frac{\text{pow\_lf}_{15.625 \text{ MHz}}}{\text{pow\_hf}_{31.25 \text{ MHz}}} = \frac{\text{win\_lf}}{\text{win\_hf}} \quad (4)$$

Figure 7:
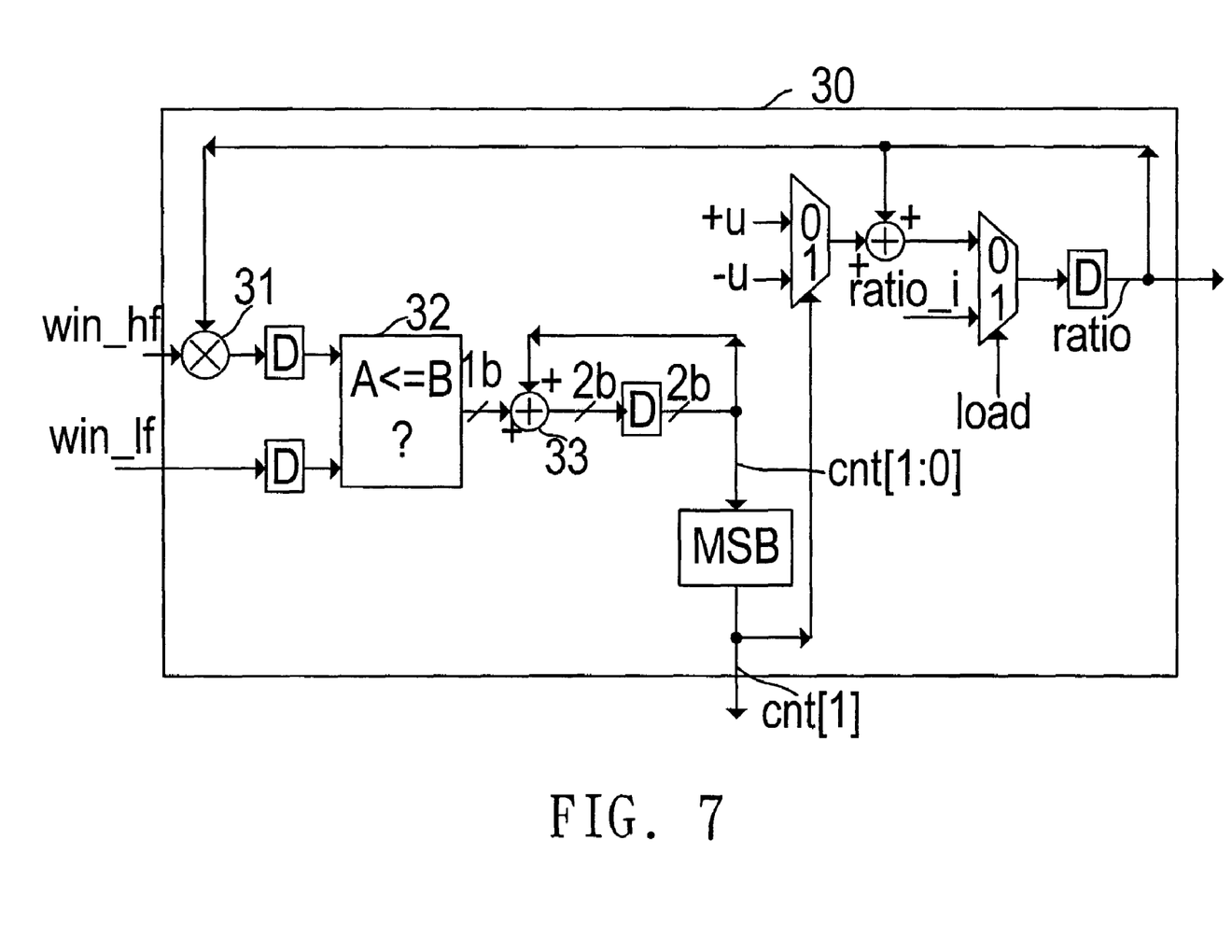
FIG. 7 is a diagram of a ratio comparing circuit according to the embodiment of the present invention.

As shown in FIG. 7, the ratio comparing circuit 30 with reduced hardware area includes a comparator 32, a first multiplier 31, a first adder 33 and appropriate logic circuits for executing the dividing operation. After initialization, an initial ratio value "ratio_i" of a channel with 0 meter is loaded by a signal "load" to a register as a current ratio. The first multiplier 31 multiplies the second window signal "win_hf" by the current ratio to produce a result. The comparator 32 compares the result and the signal "win_lf" to determine whether the current ratio is too large or too small. The first adder 33 accumulates the result from the comparator 32 so that when the number of too large or too small current ratio is over a predetermined number such as two, the current ratio is adjusted, wherein u is step size of ratio. When a signal "cnt[1]" is "0", it indicates that the accumulated number of the signal "win_lf" larger than the signal "win_hf" is over two times; i.e., the current ratio is determined to be too large for two times. Thus, the current ratio is reduced by the scale of −u. Conversely, when the signal "cnt[1]" is "1", the current ratio is increased by the scale of +u.

Figure 8:
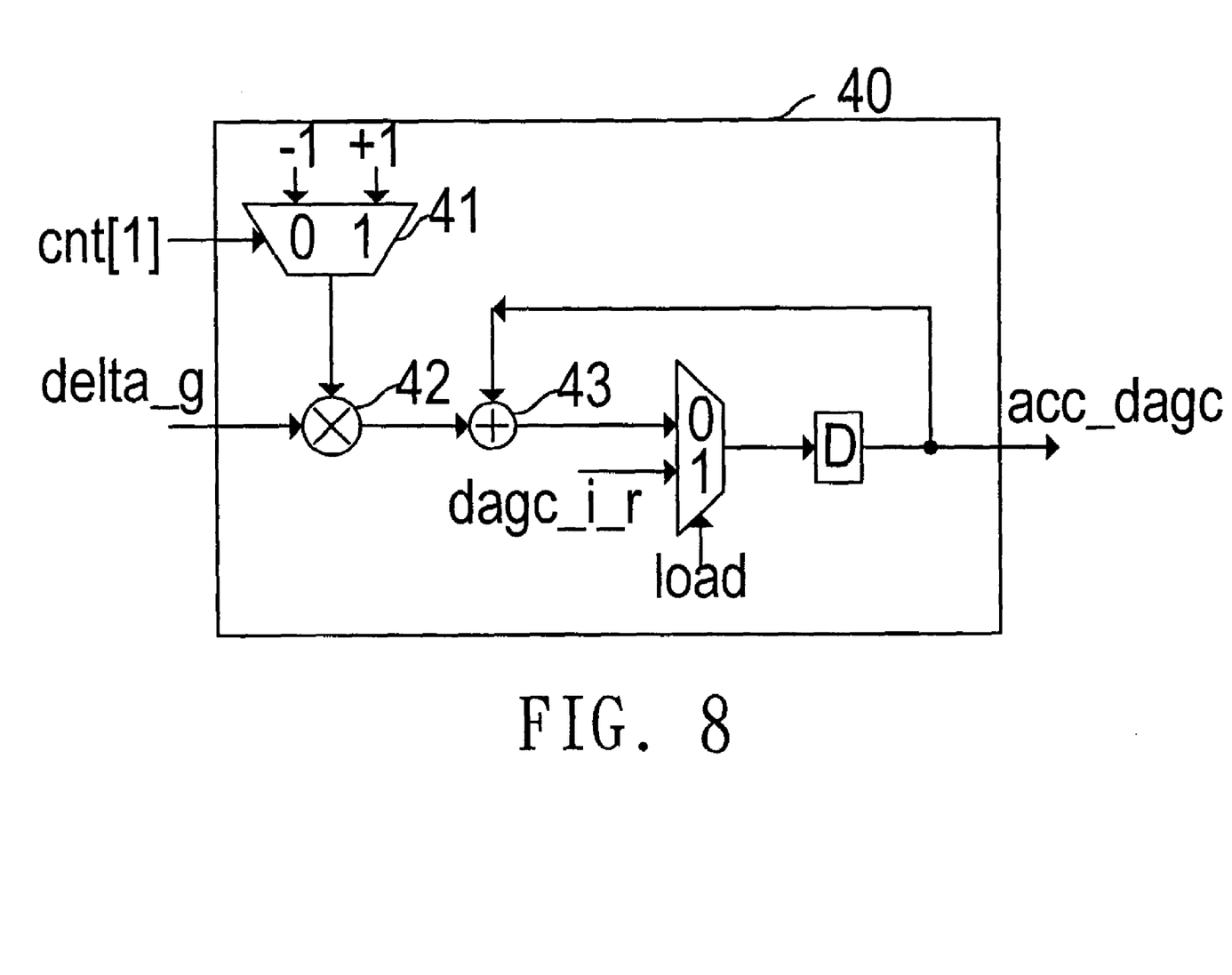
FIG. 8 is a diagram of a ratio mapping circuit according to the embodiment of the present invention.

As shown in FIG. 8, the ratio mapping circuit 40 includes a second multiplexer 41, a second multiplier 42 and a third adder 43. After initialization, an initial coefficient value "dagc_i_r" of digital AGC is loaded by the signal "load" to a register. The second multiplexer 41 has a first input terminal to input a constant +1, a second input terminal to input a constant −1, and a control terminal connected to the signal "cnt[1]" from the first adder 33 such that the constant +1 or −1 is output to adjust coefficients of the digital AGC when the first adder 33 is accumulated over a predetermined number such as two times. The second multiplier 42 multiplies the output of the second multiplexer 41 by a specific constant. The third adder 43 accumulatively adds the coefficient of the digital AGC and the output of the second multiplier 42 to adjust the coefficient of the digital AGC. A specific constant "delta_g" is defined as a ratio of a digital AGC's coefficient value to a line-length ratio value multiplied by the step size u under different channel lengths. For example, if the line-length ratio is increased linearly from 3.0 (ratio_i) to 4.125 as a channel length changes from 0 m to 100 m, and the digital AGC is increased linearly from 8.0 (dagc_I_r) to 25.0, while the line-length ratio is converged with u speed, the digital AGC is converged by the speed of "delta_g", wherein delta_g=u*(slope2/slope1), slope1= (4.125−3.0)/100 and slope2=(25.0−8.0)/100.

Figure 9:
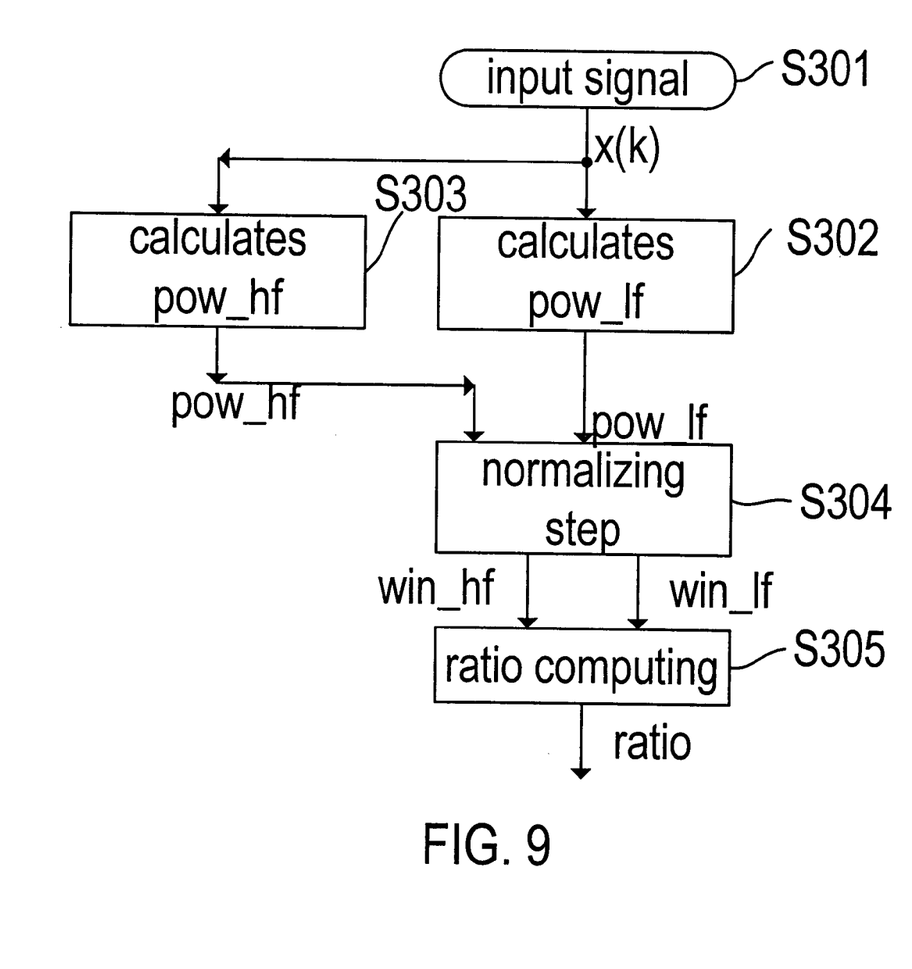
FIG. 9 is a flowchart of an Ethernet channel estimation method according to the embodiment of the present invention.

FIG. 9 shows a flowchart of the Ethernet channel estimation method disclosed in the embodiment of the present invention. In step S301, an input signal is inputted. In step S302 (step for computing the square of a first frequency response), instead of the computing the square of prior frequency response at 6 MHz, the square of "pow_lf" of 8-point first frequency response for the input signal at the first frequency (15.625 MHz) is computed by the equation $[x(0)-x(3)+x(1)-x(4)+x(7)-x(5)]^2+[x(1)+x(2)+x(3)-x(5)-x(6)-x(7)]^2$. In step S303 (step for computing the square of a second frequency response), instead of computing the square of prior frequency response at 43 MHz, the square of "pow_hf" of 4-point second frequency response for the input signal at the second frequency (31.25 MHz) is computed by the equation $[x(0)-x(2)]^2+[x(1)-x(3)]^2$.

In step S304 (normalizing step), the normalization is performed when "pow_lf" or "pow_hf" is accumulated to overflow. This is because both "pow_lf" and "pow_hf" greater than or equal to 0 are increased as a ratio of "pow_lf" to "pow_hf" is computed for line-length estimation. In this case, the ratio of "pow_lf" to "pow_hf" is an error value. Therefore, the normalizing step divides the signal "pow_lf" or "pow_hf" by a specific value (256) when the accumulation of "pow_lf" or "pow_hf" is over a specific value (0X8000$_H$) to generate a first window signal "win_lf" and a second window signal "win_hf" in normalization. Thus, the error ratio caused by the overflow is eliminated.

In step S305 (ratio computing step), it receives the first window signal and the second window signal computed by step S304 and computes the ratio, wherein the ratio and the channel length have a relation approximate to linearity. Thus, the ratio can be converted into coefficients corresponding to the DFE, analog or digital AGC.

As aforementioned, the Ethernet channel estimation device and method uses a line-length estimation method regardless of transmitter power and thus has high accuracy. Additionally, the approximate DFT computation is used in the invention and the prior divider is replaced with the simple logic circuits and comparators to simplify required hardware. In such a simple configuration, the present invention provides accurate conversion to coefficients of the DFE, analog or digital AGC.

Although the present invention has been explained in relation to its preferred embodiment, it is to be understood that many other possible modifications and variations can be made without departing from the spirit and scope of the invention as hereinafter claimed.

What is claimed is:

1. An apparatus for estimating a channel length, comprising:
    a frequency response square computing circuit, to generate a first frequency response corresponding, to a first frequency and a second frequency response corresponding to a second frequency according to a input signal, and to square the first and the second frequency response; and
    an estimating circuit, to estimate the channel length according to the squares of the first frequency and the second frequency response;
    wherein the input signal is transmitted in a symbol rate and the first frequency and the second frequency are 1/M and 1/N times of the symbol rate respectively, wherein M and N are in the order of 2.

2. The apparatus as claimed in claim 1, wherein the first and the second frequency response are computed through discrete Fourier Transform (DFT).

3. The apparatus as claimed in claim 1, wherein the estimating circuit further comprises a magnitude normalization circuit to normalize the squares of the first frequency and the second frequency response.

4. The apparatus as claimed in claim 1, further comprising a mapping circuit to generate a plurality of coefficients of at least one of a Decision Feedback Equalizer (DEF), an analog auto-gain controller (AGC), and a digital AGC.

5. The apparatus as claimed in claim 1, wherein the symbol rate is 125 MHz.

6. The apparatus as claimed in claim 5, wherein the first frequency is substantially 15.625 MHz and the second frequency is substantially 31.25 MHz.

7. An apparatus for estimating a channel length, comprising:
    a frequency response square computing circuit, to generate a first frequency response corresponding to a first frequency and a second frequency response corresponding to a second frequency according to a input signal, and to square the first and the second frequency response;
    a magnitude normalization circuit to generate a first window signal to a second window signal through normalizing the squares of the first frequency and the second frequency response receive the frequency response squares of the first frequency and the second frequency; and
    a comparing circuit, to estimate the channel length according to the comparison of the first and the second window signal.

8. The apparatus as claimed in claim 7, further comprising an adjusting circuit to adjust a plurality of coefficients of at least one of a Decision Feedback Equalizer (DEF), an analog-auto-gain controller (AGC), and a digital AGC.

9. The apparatus as claimed in claim 7, wherein the first and the second frequency response are computed through discrete Fourier Transform (DFT).

10. The apparatus as claimed in claim 7, wherein the symbol rate is 125 MHz, the first frequency is substantially 15.625 MHz and the second frequency is substantially 31.25 MHz.

11. The apparatus as claimed in claim 7, wherein the comparing circuit further comprises:
    a ratio generate circuit to generate a ratio according to the first and the second window signal;

a ratio comparing circuit to compare the ratio with a setting value; and an ratio adjust circuit to adjust the first and the second window signal according to the comparison of the ratio and the setting value.

12. The apparatus as claimed in claim 7, wherein a magnitude normalization circuit to generate a first window signal to a second window signal through bit-shifting predetermined k bits.

13. A method for estimating a channel length, comprising:
generating a first frequency response corresponding to a first frequency and a second frequency response corresponding to a second frequency according to a input signal;
squaring the first and the second frequency response; and
estimating the channel length according to the squares of the first frequency and the second frequency response;
wherein the input signal is transmitted in a symbol rate and the first frequency and the second frequency are 1/M and 1/N times of the symbol rate respectively, wherein M and N are in the order of 2.

14. The method as claimed in claim 13, wherein the first and the second frequency response are computed through discrete Fourier Transform (DFT).

15. The method as claimed in claim 13, wherein the method further comprises normalizing the squares of the first frequency and the second frequency response.

16. The method as claimed in claim 13, wherein the method further comprises generating a plurality of coefficients of at least one of a Decision Feedback Equalizer (DEF), an analog auto-gain controller (AGC), and a digital AGC.

17. The method as claimed in claim 13, wherein the symbol rate is 125 MHz.

18. The method as claimed in claim 17, wherein the first frequency is substantially 15.625 MHz and the second frequency is substantially 31.25 MHz.

* * * * *